United States Patent [19]
Freund et al.

[11] Patent Number: 5,333,740
[45] Date of Patent: Aug. 2, 1994

[54] STORAGE/DISPLAY RACK FOR DISCS AND CASSETTES

[76] Inventors: Richard A. Freund, 3207 Norwood Dr., Fair Lawn, N.J. 07410; Allen E. Peller, 6650 S. Sandhill #106, Las Vegas, Nev. 89120

[21] Appl. No.: 929,530
[22] Filed: Aug. 14, 1992
[51] Int. Cl.⁵ .............................................. B65D 85/57
[52] U.S. Cl. ...................................... 211/40; 206/387
[58] Field of Search ........................... 211/40, 41, 52; 206/387

[56] References Cited
U.S. PATENT DOCUMENTS

| | | | |
|---|---|---|---|
| 2,691,447 | 11/1954 | Schiffer . | |
| 2,886,182 | 5/1959 | Dauman . | |
| 3,391,792 | 7/1968 | Makar . | |
| 4,684,027 | 8/1987 | Wright | 211/40 |
| 4,796,761 | 1/1989 | Hermelin | 211/11 |
| 4,815,795 | 3/1989 | Accumanno et al. | 211/40 X |
| 4,832,195 | 5/1989 | Dahl | 211/40 X |
| 4,844,264 | 7/1989 | Deskiewicz, Jr. | 211/50 |
| 5,027,955 | 7/1991 | Shoemaker, Jr. et al. | 211/40 |
| 5,191,977 | 3/1993 | Markovitz | 211/40 X |

*Primary Examiner*—P. Austin Bradley
*Assistant Examiner*—Jeanne M. Elpel
*Attorney, Agent, or Firm*—Cushman, Darby & Cushman

[57] ABSTRACT

A storage/display rack has a shelf, side walls, and a center wall enclosing a first storage volume under the shelf. A delineator delimits a second storage volume behind the center wall and fixes the position of the rack when the rack is used as an insert within a bookshelf or other larger piece of furniture. The delineator also delimits a second storage volume when the rack is used on an open surface, such as a table.

4 Claims, 3 Drawing Sheets

STORAGE/DISPLAY RACK FOR DISCS AND CASSETTES

BACKGROUND OF THE INVENTION

The present invention relates generally to a storage/display rack for holding articles such as compact discs, audio and video cassettes, computer discs, and the like in an accessible manner both physically and visibly.

Space efficient, and easy accessible storage and display facilities for objects such as compact discs, audio or video cassettes, computer discs or the like are desirable to facilitate the organization and arrangement of such objects. A storage and display facility also decreases the risk of damaging such articles. Various storage and display racks have been proposed in the past. These display racks typically have not been space efficient, have required special furniture which makes the unit expensive, or deface existing furniture by requiring activities such as nailing, screwing, or gluing the unit to another object such as a wall or a desk.

SUMMARY OF THE INVENTION

It is therefore an object of this invention to provide a rack for storing and displaying compact discs, audio and video cassettes, computer discs, and the like in a neat and accessible form. The invention is also space efficient, compatible with standard furniture such as bookcases and desk tops, and does not deface the existing furniture. Moreover, the storage/display rack can be moved quickly and easily from location to location.

The storage/display rack has a generally planer shelf which can hold the articles which are to be displayed. The shelf has a separation barrier which restrains the stored articles from falling off of the shelf and into the second storage volume. In the preferred embodiment, the shelf is supported by the pair of spaced opposite side walls and the center wall. The arrangement of the shelf, the side walls and the center wall forms a first storage volume below the shelf. The first storage volume can be used to hold articles which are to be displayed.

The storage/display rack has a delineator which delimits a second storage volume. The second storage volume can hold a number of different items such as a cleaning kits for compact discs. When the storage/display unit is placed in an object, such as a bookcase, the delineator also prevents the unit from sliding to the rear of the object in which it is placed.

DETAILED DESCRIPTION OF THE PREFERRED EMBODIMENT

A storage/display rack 10 for storing and displaying rectangular shaped articles such as compact discs is illustrated in FIGS. 1-4. The storage/display rack depicted in FIGS. 1-4 is dimensioned for displaying and storing fifty-two (52) compact discs 30. A standard compact disc case has the dimensions of 4.9 inches W 5.6 inches L 0.4 H inches. However, the storage/display rack's dimensions can be altered to permit the storage and display of other similar articles, such as audio and video cassettes, and computer discs.

Figure 1:
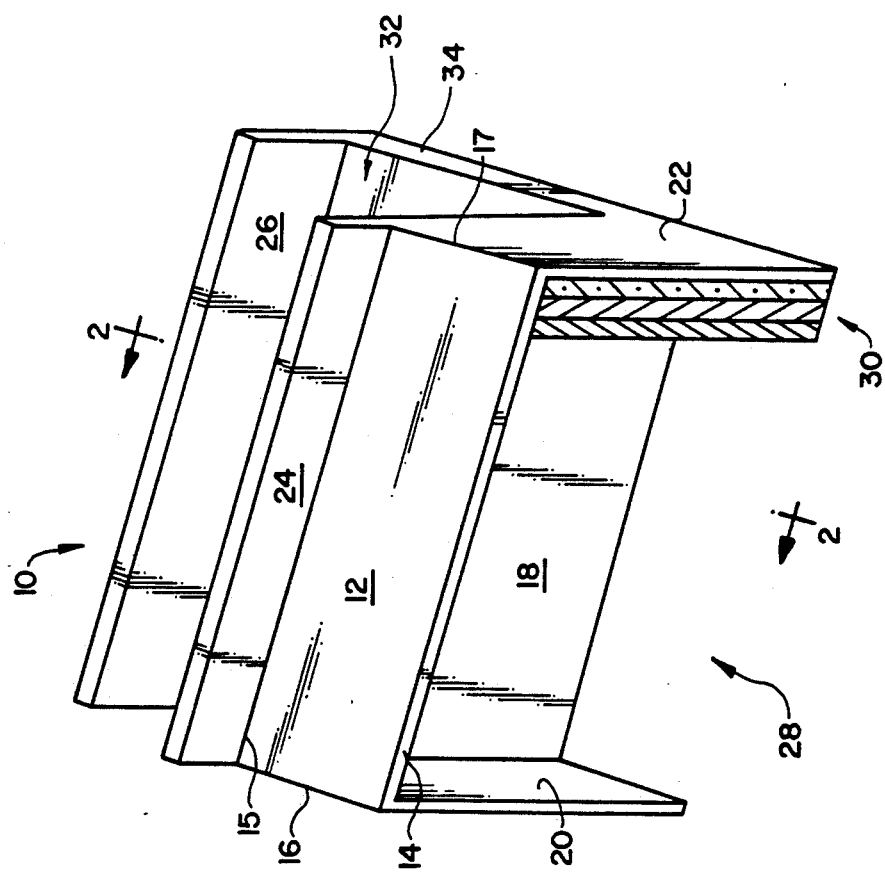
FIG. 1 is an isometric view of the storage/display rack.

As shown in FIG. 1, the storage/display rack has a shelf 12 on which the articles to be stored can be placed in a side-by-side arrangement. Shelf 12 is generally planer and rectangular having two relatively longer sides 14 and 15 and two relatively shorter sides 16 and 17. A pair of spaced opposite side walls 20 and 22 are attached to the relatively short sides 16 and 17 of shelf 12. A center wall 18 is attached to one relatively long side 15 of shelf 12 and to the side walls 20 and 22. It is preferable that the side walls 20 and 22, and the center wall 18 be attached at a 90 degree angle to the shelf 12. The attachment of the shelf 12, the side walls 20 and 22, and the center wall 18 forms a first storage volume 28 dimensioned for storing and displaying compact discs 30. However, as noted above, the dimensions of the first storage volume 28 can be altered to allow for storage and display of other articles.

Attached to and transversing the relatively long side 15 of shelf 12 is a separation barrier 24. Separation barrier 24 extends upward from shelf 12 to at least the height which will prevent compact disc 30 from falling off the shelf 12. However, separation barrier 24 should be low enough to allow access to the second storage volume 32. Separation barrier 24, as depicted in FIG. 1, is formed by extending the center wall 18 above the shelf 12 so that the top portion of the center wall 18 is higher than the top portion of shelf 12. However, separation barrier 24 may also be formed by a variety of other techniques such as attaching a separate piece of material to the top of shelf 12.

Figure 2:
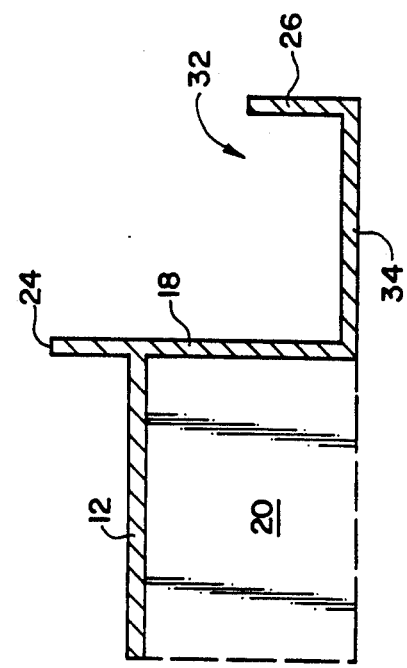
FIG. 2 is a cross-sectional view taken along line 2—2 of FIG. 1.

As seen in FIG. 2, the delineator, which delimits a second storage volume 32, includes a base 34 mounted to the bottom portion of center wall 18 and a backstop 26 extending upward from the end of the base 34. There are numerous other arrangements which can be used to delimit the second storage volume 32. However, as discussed below, there are certain advantages gained by using the delineator shown in FIGS. 1-4.

Figure 3:
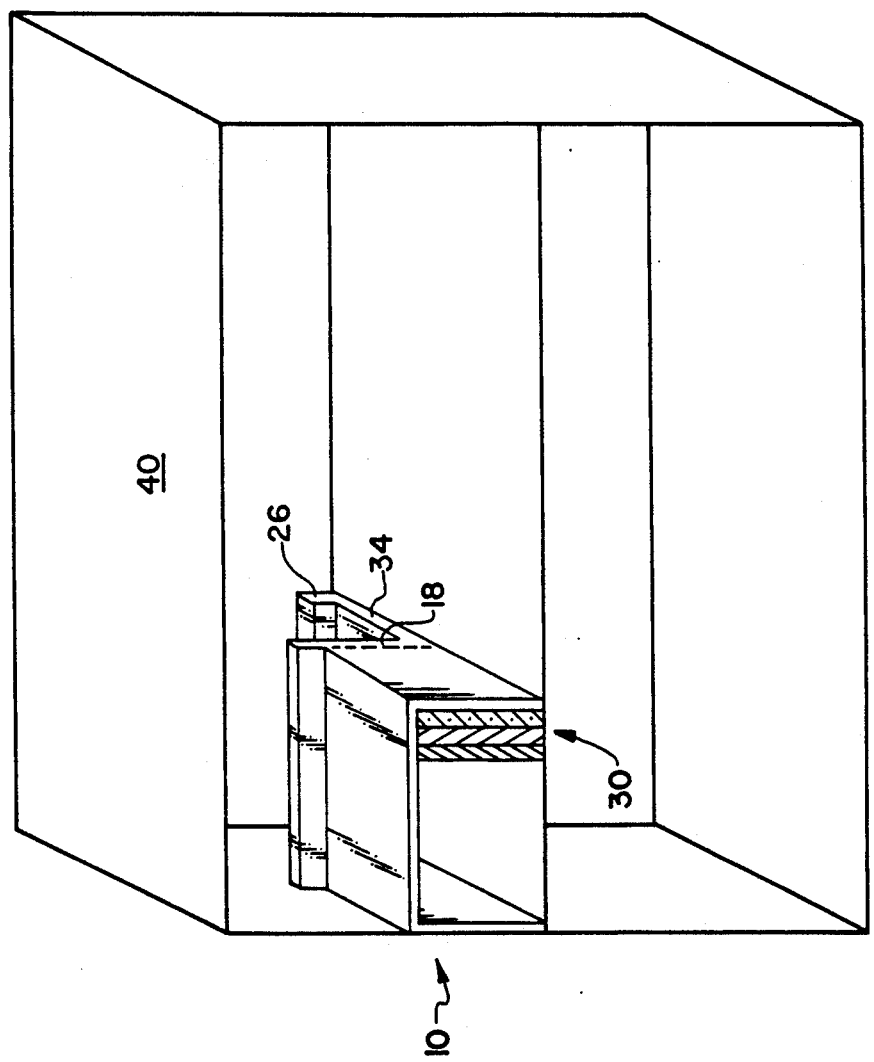
FIG. 3 is an view of the storage/display rack as it would appear in ordinary use within a bookcase.

As shown in FIG. 3, the delineator prevents the storage/display rack 10 from sliding to the rear of a bookcase 40, thereby fixing the front of the storage/display rack 10 with respect to the back of the bookcase 40. The delineator of the preferred embodiment includes a base 34 mounted to the bottom portion of center wall 18 and a backstop 26 extending upward from then end of the base 34. However, there are numerous other arrangements which can be used to prevent the storage/display rack from sliding to the rear of the bookcase 40.

Figure 4:
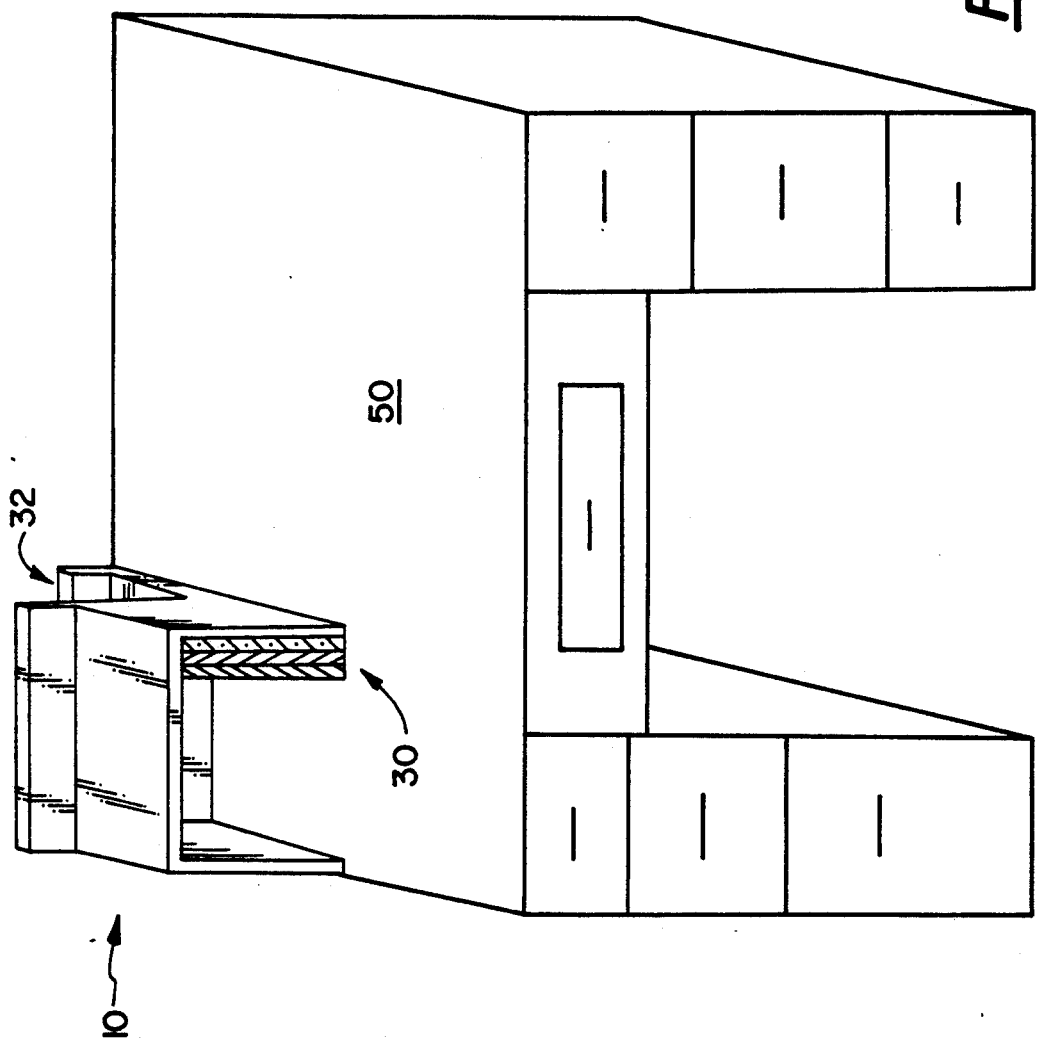
FIG. 4 is an view of the storage/display rack as it would appear in ordinary use on a desk top.

As shown in FIG. 4, because the delineator used in the preferred embodiment also delimits the second storage volume 32, the same embodiment of the storage/display rack 10 can be used not only in a bookcase 40 but also on a desk top 50 or other open surface. Another advantage of this arrangement is that no extra hardware like screw drivers and wrenches are required to install the storage/display rack. Moreover, the embodiment shown in FIGS. 1-4 eliminates the need to deface existing furniture as would result from the use of hardware such as nails, screws, or glue for positioning the storage/display. Furthermore, the unit can be used in conjunction with standard furniture, thereby eliminating the need for new specially designed furniture.

The dimensions of shelf 12 are approximately 11 and ⅞ inches by 5 and ⅞ inches. The dimensions of side walls 20 and 22 are approximately 5 and ⅞ inches by 6 inches. The combined height of center wall 18 and separation barrier 24 is approximately 7 and ¼ inches. The length of center wall 18 and separation barrier 24 is approximately 11 and ⅞ inches. The dimensions of base 34 are approximately 6 inches by 11 and ⅞ inches. Backstop 26 is approximately 3 inches high and 11 and ⅞ inches long. Shelf 12, side walls 20 and 22, center wall 18, separation barrier 24, base 34, and backstop 26 are all ⅛ inches thick.

The storage/display rack 10 may be formed of many different materials and by many different methods which are well known in the industry. However, the preferred method of making the storage/display rack 10 is by forming a single unitary piece through plastic mold injection.

We claim:

1. A storage/display rack useful as an insert and as an open-surface unit comprising:
   a center wall;
   a substantially horizontal shelf disposed at a front face of the center wall;
   first and second side walls disposed under the shelf, such that the shelf, the center wall and the side walls at least partially enclose a first storage volume;
   means for delimiting a second storage volume, an edge of the second storage volume fixed at a separation distance from a rear face of center wall.

2. A rack as in claim 1 further comprising separation means for forming a barrier preventing objects on the shelf from sliding into the second storage volume.

3. A rack as in claim 1 wherein the shelf is disposed to enclose a volume approximately 5-6 inches in height.

4. A rack as in claim 1 wherein the side walls and center wall are disposed to enclose a volume approximately 5-6 inches in depth.

* * * * *